Patented May 15, 1923.

1,455,435

UNITED STATES PATENT OFFICE.

THOMAS H. FAIRBROTHER AND ARNOLD RENSHAW, OF MANCHESTER, ENGLAND, ASSIGNORS TO BRITISH DYESTUFFS CORPORATION LIMITED, OF MANCHESTER, ENGLAND.

TREATMENT OF SEWAGE.

No Drawing.   Application filed February 19, 1923.   Serial No. 620,014.

*To all whom it may concern:*

Be it known that we, THOMAS HAROLD FAIRBROTHER and ARNOLD RENSHAW, M. D., subjects of the King of England, and residents of Manchester, in the county of Lancashire, England, have invented certain new and useful Improvements in the Treatment of Sewage, of which the following is a specification.

In many cases the best method for the treatment of sewage would be by a process of aeration in tanks, for instance, according to the system known as the activated sludge treatment or the simplex surface aeration process. When working properly, this treatment in many cases gives the best result from the point of view of purity of effluent, richness in valuable constituents of the sludge, and economy of working.

The process suffers from the disadvantage that after varying and indefinite periods of time the organisms on whose activity the success of the process depends lose their efficiency wholly or in part and then the attempted purification fails and a new start has to be made.

It has been found that this loss of vitality in the bacteria is accompanied by the protozoa getting the upper hand in the medium and in some way preventing the bacteria from flourishing. A moderate number of protozoa exert no deleterious influence and may indeed be beneficial but the trouble referred to and which is known as "bulking" of the sludge is always accompanied by a large increase in the number of protozoa present. We have found that the dyestuffs of the oxazine class such as, for instance, Meldola blue and the Nile blue brands and their analogues, especially the ethyl compound corresponding to Meldola blue, in a solution of about one part in 5,000 to 80,000 parts of water will destroy certain protozoa whilst leaving the useful bacteria of this process uninjured. In many cases it is useful to add a proportion of some other basic dye such as auramine O to the dye of the oxazine class used but care must be taken in making such additions that the concentration of the dye used is not such that it will materially injure the bacteria. The amount of auramine taken should not exceed in antiseptic action the quantity of oxazine dye taken.

By utilizing these discoveries we have invented a process for revivifying the tanks in this sewage treatment which consists simply in treating the said tanks whenever their activity shows signs of falling off with a solution of one or a mixture of more than one of the above mentioned colouring matters having a strength of about one part in 5,000 to one part in 80,000.

In view of the differences that exist between the sewage of different districts and even at the same purification plant at different times, especially owing to the admixture of industrial effluents no hard and fast rule can be given for the quantity of colouring matter to be used, but this can be determined by simple laboratory experiments 10 ccs. of the sludge are taken and the dye solution added from a burette, test portions of the sludge being microscopically examined from time to time. Sufficient dyestuff solution should be added to substantially kill off the protozoa in a quarter of an hour. From this the amount of colouring matter to be added to the sludge tank can be calculated.

The treatment can, for example, be effected as follows: When the sludge shows signs of losing its activity the admission of raw sewage to the tanks in question is stopped and as soon as possible the sludge is allowed to settle, and most of the supernatant liquor run off and the colouring matter chosen is mixed with the sludge and residue of water to give a solution of about one part in 5,000 or the strength determined by the test above described. The colouring matter is conveniently added in solution. This is mixed by blowing in air or agitation or a combination of the two and is continued until it can be seen from the microscopic examination of samples that substantially the whole of the protozoa are killed. The sludge is again allowed to settle, the supernatant fluid run off, and fresh sewage is admitted and treatment continued in the usual way.

The following is an example of an actual treatment in a tank worked on the simplex surface aeration system. At this plant the sludge was "bulking" very badly so that a considerable amount had to be taken out daily in order to keep the sludge down. Before the experiment the sludge after one hour's settlement occupied about 70% of the bulk. The aeration was stopped and the sewage allowed to settle and then the contents of the tank were pumped out until only 3600 gals. of sludge remained. This was examined in the laboratory and found to contain a very large number of protozoa. A solution of 10 lbs. of Meldola's blue in 50 gals. of water was then added to the sludge. A dilution of one part in 3000 being thus obtained. This was agitated by means of an air blast and after 30 minutes diluted with an equal volume of sewage, then agitated again and after about one hour or more the tank was filled up with sewage and aeration continued overnight. As soon as possible after the addition of the colouring matter solution, that is within 15 minutes, a sample of the sewage was examined microscopically and it was found that the protozoa were dead. After the treatment no trace of "bulking" was noted and directly the tank become normal good purification was brought about with no further "bulking" trouble for over a month.

The ethyl derivative corresponding to Meldola blue has been found to be more active and a smaller quantity would be required.

Although in the above examples we have described the treatment of the sewage after the "bulking" trouble showed itself we do not restrict ourselves to this remedial treatment. In many cases the occurrence of trouble could be prevented by regular additions of the colouring matters mentioned to the sludge.

Now what we claim is:—

1. The improvement in the treatment of sewage by tank aeration processes which consists in adding coloring matter of the oxazine series to the sewage sludge.

2. The improvement in the treatment of sewage by tank aeration processes which consists in adding coloring matter of the oxazine series mixed with other basic colouring-matter to the sewage sludge.

3. The improvement in the treatment of sewage by tank aeration processes which consists in adding a Meldola blue to the sewage sludge.

4. The improvement in the treatment of sewage by tank aeration processes which consists in adding a Meldola blue mixed with Auramine to the sewage sludge.

5. The improvement in the treatment of sewage by tank aeration processes which consists in adding a solution of two to fifteen pounds of a Meldola blue to every 3600 gallons of sewage sludge.

6. The improvement in the treatment of sewage by tank aeration processes which consists in adding a mixture of a Meldola blue with Auramine in such quantity that its antiseptic action does not exceed that of the oxazine dyestuff taken to every 3600 gallons of sewage sludge.

In testimony whereof, we have hereunto affixed our signatures.

THOMAS H. FAIRBROTHER.
ARNOLD RENSHAW, M. D.